United States Patent Office 3,278,320
Patented Oct. 11, 1966

3,278,320
REFRACTORY
Joseph E. Neely and Jacques R. Martinet, Santa Clara County, Calif., assignors to Kaiser Aluminum & Chemical Corporation, Oakland, Calif., a corporation of Delaware
No Drawing. Filed Aug. 11, 1965, Ser. No. 478,980
19 Claims. (Cl. 106—58)

This application is a continuation-in-part of our co-pending application, Serial No. 224,223, filed on or about September 17, 1962, now abandoned.

This invention relates to a refractory composition, for instance, such as is suitable for patching or maintaining a furnace lining, such as a furnace wall or roof; and more particularly it relates to a nonacid gunning composition for such use in high temperature metallurgical furnaces.

In high temperature metallurgical furnaces, such as open hearth furnaces for melting steel, or in other types of metal melting furnaces, it has been customary to repair the interior linings by patching with a refractory mix, such as nonacid or basic mix, made up of nonacid or basic grain material and a bonding agent, and to apply such patching material either by ramming into place or by placement by means of a nozzle-mix gun such as a Ridley gun (made by Ridley and Co.) or a Jet-Crete gun (made by Engineered Equipment, Inc.) or by a slurry gun, in which event the refractory composition is first formed into a slurry with water and is then gunned from a tank in the manner well known in this art. In such application, and particularly in the gunning mixes, it is desired to have a material which can be fed onto a hot furnace wall and which will bond well thereto and remain in place during operation of the furnace. Some prior art mixes have had the disadvantages of not bonding to hot walls, so that it has been necessary to cool the furnace down considerably, then to place the patching material and again to heat the furnace to operating conditions, all of which understandably causes considerable lost time. Other mixes have had the disadvantages of too high rebound from the walls; or, alternatively, that after once being placed, and upon further heating in the furnace, they crack and peel away so that a patch material does not remain in good condition and in place for a satisfactorily long time.

According to the present invention it has now been found that the refractory composition of this invention guns well onto a furnace wall, particularly when the latter is in heated state, and bonds well thereto; and that peeling away of the patch material upon further heating is substantially avoided. The composition adheres well to the hot surface and remains in good condition for a substantially longer time than other known gunning or ramming compositions for a similar use.

The refractory composition herein consists essentially of a nonacid aggregate, preferably chosen from the group consisting of chromite, magnesia and mixtures of chromite and magnesia, and the bonding agent or agents shown below. One suitable composition consists essentially of from 50% to 95% of chrome ore, or chromite, from 0% to 45% of finely divided nonplastic magnesia, from 1% to 5% of at least one bonding agent chosen from the group consisting of an alkali metal tripolyphosphate and tetra-alkali metal-pyrophosphate, from 0.05% to 3% of a plasticizing agent, and from 0% to 3%, preferably 0.5% to 3%, of finely divided iron oxide, as added. One preferred composition consists essentially of from 50% to 95% chromite, from 5% to 45% finely divided nonplastic magnesia, from 1% to 5% of the aforesaid bonding agent, from 1% to 3% of plastic clay and from 0.5% to 3% of finely divided, added iron oxide. In another embodiment, the refractory aggregate suitably is an admixture of coarse fired dolomite retained on 35 mesh and a minor amount of nonplastic magnesia passing 35 mesh.

The chromite component of the present invention is suitably any chrome, or chromite, ore. For instance, there can be employed Masinloc chromite ore. Alternatively, there can be used a Transvaal chrome ore having a typical analysis of the following ranges: 30% to 45% $Cr_2O_3$, 1% to 20% $SiO_2$, 8% to 25% $Al_2O_3$, 15% to 29% $Fe_2O_3$, 0.1% to 3% $CaO$, and 5% to 20% $MgO$. Any other desired chrome ore can be employed. The chromite component is preferably substantially all finer than 20 mesh when used in a gunning mix and about 50% to 65% of the minus 20 mesh material will pass through a 100 mesh screen.

The magnesia component of the chromite and magnesia mixtures is any dead burned magnesia material such as periclase, for example, high purity periclase, or dead burned magnesite, etc.; and it is preferred that such magnesia component contain at least about 80% of magnesium oxide. Where magnesia or periclase is the sole nonacid aggregate it is preferably periclase containing at least 95% MgO. The magnesia material is fired to such state that there will be substantially no shrinkage upon further firing in place; and therefore a dead burned, hard burned or fused magnesia product is suitable for the magnesia component of the chromite-containing mixtures. In the compositions of this invention a minor amount, i.e. less than 50% of magnesia, where present, is used in finely divided state, in order to accelerate formation of a ceramic or mineral bond upon firing in place; and such magnesia is preferably employed in sizes of substantially 100% less than 100 mesh. Where high purity periclase is employed as sole aggregate it is preferred to admix from about 0.5% to 1.5%, suitably about 1%, of a hydration inhibitor such as sodium borate decahydrate.

The plasticizing agent where used is in readily dispersible form, e.g., as soluble in the mixing water or in finely divided form, and if an insoluble solid, is preferably all minus 200 mesh. A suitably plastic clay or bentonite can be employed as such plasticizer. Alternatively, there can be employed an organic plasticizing agent such as sodium carboxymethyl cellulose, a water-soluble polymer of the sodium salt of acrylic acid (Cyanamer 370) and the like. As stated above, from 0.05% to 3% of plasticizing agent is preferably employed. Where such plasticizer is a clay, it should be added in an amount of from 1% to 3%; and where it is an organic plasticizer, preferably from 0.05% to not over 1% is added. Mixtures of the plasticizing agents with each other can be employed, if desired.

The iron oxide which is added is in very finely divided form and it has been found that an excellent source of iron oxide for this composition is the material which is deposited from the fumes issuing from oxygen steel converters in which a bath of molten metal is blown with oxygen to form steel. Large quantities of fumes issue from such converters during the blow and a major component of such fumes is finely divided iron oxide, substantially 90% passing through a 325 mesh screen. It is preferred that the iron oxide component be substantially entirely passing through a 100 mesh screen, but it is preferred for best results that at least 80% pass through a 325 mesh screen. Any of the so-called "precipitator" dusts from steel plants, which are high in iron oxide, are suitable for use as the iron oxide component, that is, where they contain at least 85% of iron oxide. Another suitable iron oxide material is a very finely ground mill scale, and of the particle sizes noted as preferable herein.

It is to be understood that the iron oxide can alternatively be provided by free iron oxide in the chromite ore employed; and in such event, added iron oxide may not be required, or a lesser amount may be required to provide total iron oxide within the range stated.

The alkali metal tripolyphosphate which is employed as a bonding agent in the present composition has the following typical chemical composition: $M_5P_3O_{10}$, where M is an alkali metal, such as sodium, potassium or lithium. A preferred material is sodium tripolyphosphate $Na_5P_3O_{10}$, also known as pentasodiumtriphosphate. There can alternatively be employed a tetra-alkali metal-pyrophosphate, such as tetrasodium pyrophosphate, $Na_4P_2O_7 \cdot 10H_2O$, which contains a minimum of 63.5% $P_2O_5$ in combination with $Na_2O$, or tetrapotassium pyrophosphate.

In making up the composition of the present invention, the aggregate, e.g., the chromite, magnesia, etc., the tripolyphosphate or tetrasodium pyrophosphate, or like salt, plasticizing agent and iron oxide components are mixed together in any desired sequence of steps and can be shipped and stored for use as desired. It is preferred that the material be kept out of contact with water until time for use because it readily sets up or bonds together in the cold upon the addition of water.

It is an advantage of the present invention that the composition readily bonds to either hot or cold furnace wall surfaces; and that, as a gunning mix, it can be readily applied by means of the usual gunning devices, preferably a slurry gun, for such application of refractory materials. It is a particular advantage of the present invention that the composition is resistant to spalling, peeling and cracking under furnace operating conditions. The following example will describe an advantageous embodiment of the present invention:

EXAMPLE 1

A composition useful as a gunning mix is prepared as follows: There are admixed Masinloc chrome ore of the chemical composition and the particle sizing shown below, periclase as shown below, and the other ingredients, all in the amounts indicated:

| | Percent by weight |
|---|---|
| Chromite (composition: 29.9% $Cr_2O_3$, 5.5% $SiO_2$, 27.9% $Al_2O_3$, 14.3% $Fe_2O_3$, 0.8% CaO, and 21.6% MgO; 39.7% passing 20 mesh and retained on 100 mesh; 60.3% passing 100 mesh (about 26.7% passing 325 mesh) | 82.0 |
| Periclase (composition: 2.1% $SiO_2$, 1.0% CaO, 0.3% $Cr_2O_3$, 0.3% $Al_2O_3$, 0.5% $Fe_2O_3$, 0.1% ignition loss and 95.7% MgO (by difference); 97.5 passing 100 mesh, including about 62% passing 325 mesh) | 13.0 |
| Sodium tripolyphosphate ($Na_5P_3O_{10}$) | 3.0 |
| Bentonite, passing 100 mesh | 1.0 |
| Precipitator dust (from oxygen steel converter fumes) | 1.0 |

(The precipitator dust contains 90% of particles passing through a 325 mesh screen and contains 90% of iron oxide.)

The above ingredients are thoroughly intermixed and are shipped to the place of use where the mix is slurried in 20–30% by weight of water and is applied to a hot furnace wall by means of a slurry gun of the type well known in this art. If desired, the slurry mix is placed in the gun device and the whole is then transported to the job. The mix is forced from the gun chamber by air pressure into the feed line where auxiliary air pressure forces it along and out through the nozzle, directed to the furnace wall.

The gunning mix is applied to a hot open hearth furnace wall with the following results: A thin coating (⅛ to ½ inch thick) is applied to the hot faces of existing refractory walls or roofs, and upon burning in forms a monolithic coating on the existing refractories, where it absorbs fluxes which would otherwise attack the existing refractories and thus the mix protects the refractories and delays wear thereon.

As a comparative test, another mix of exactly the same composition except that the sodium tripolyphosphate is not added and there is included instead about 3.5% by weight of sodium silicate as bonding agent, is applied in the same manner to another portion of the same wall and completely fails to adhere to the hot refractory surface.

A very satisfactory gunning mix is obtained by admixing from 50% to 90% chromite grains, from 5% to 45% finely divided nonplastic magnesia, from 3% to 3.5% sodium tripolyphosphate, from 1% to 3% bentonite and from 1% to 1.5% finely divided iron oxide, e.g. precipitator dust from oxygen converters as described above.

EXAMPLE 2

Another composition useful in this invention is prepared as follows: There are admixed 50% by weight of periclase particles of the chemical composition shown in Example 1, of which amount 10.5% passes 48 mesh and remains on 100 mesh, 27% passes 100 mesh and remains on 200 mesh, 8.5% passes 200 mesh and remains on 325 mesh, and 4% passes 325 mesh; and 44.5% chromite ore of the chemical analysis shown in Example 1, and of which 12% passes 100 mesh and remains on 325 mesh and 32.5% passes 325 mesh; 1.3% bentonite, 1.0% of the finely divided iron oxide as shown in Example 1 and 3.2% sodium tripolyphosphate. The composition is applicable to a furnace wall by gunning in a manner as in Example 1.

EXAMPLE 3

A further composition useful in this invention is prepared by admixing 94.3% of periclase of particle sizes about 17% by weight passing 20 mesh and retained on 65 mesh, 27% by weight passing 65 and retained on 200 mesh, 13% passing 200 and retained on 325 mesh and 37.3% passing 325 mesh, this periclase having a typical chemical analysis of 2.1% $SiO_2$, 1.0% CaO, 0.4% $Cr_2O_3$, 0.4% $Al_2O_3$, 0.6% $Fe_2O_3$, 95.5% MgO (by difference); and 3.2% sodium tripolyphosphate, 1.5% bentonite and 1% sodium borate decahydrate. This composition is also applicable to a furnace wall by gunning as in the previous examples.

The refractory composition of the present invention is suitable for use in high temperature furnaces, such as metallurgical furnaces, for instance open hearth furnaces and others.

It will be understood that in the composition of the present invention, instead of the sodium tripolyphosphate described above in the example, there can alternatively be employed a tripolyphosphate of potassium, lithium, ammonium or other alkali metal, "ammonium" being considered here as an alkali metal or equivalent thereof, except that the ammonium compound yields unpleasant fumes of decomposition upon mixing or burning in. Alternatively, there can be employed a tetrasodium pyrophosphate of the following chemical composition: $Na_4P_2O_7$ or the hydrate thereof such as $Na_4P_2O_7 \cdot 10H_2O$.

In the above description and in the claims percentages and parts, where shown, are by weight unless otherwise indicated. In conformity with common practice in reporting chemical analyses of refractory materials, in the specification and claims the proportions of the various chemical constituents are given as though these constituents were present as the simple oxides. Thus, for example, the magnesium constituent is referred to or expressed as MgO and the iron oxide is referred to as $Fe_2O_3$, although the magnesia and iron oxide may be present at least in part in combination with each other or with another component of the mixture and the iron oxide may actually exist in part as ferrous oxide. The screen sizes given herein are Tyler screens as defined on page 1719 of Chemical Engineers Handbook, John H. Perry, editor-in-chief, published by McGraw-Hill Book Company, second edition, 1941. The plasticizer Cyanamer 370 referred to hereinabove is made and distributed by American Cyanamid Company. Another suitable plasticizer is Carbopol 370R, made by B. F. Goodrich Chemical Company, which is a water-soluble resin. As aggregate or grain material of the composition of the present invention, where a mixture of chromite and magnesia is employed, it is preferred that the mix contains, on the refractory oxide basis, from 5% to 95% chromite and from 95% to 5% magnesia.

Having now described the invention, what is claimed is:

1. Refractory composition consisting essentially of nonacid refractory particles chosen from the group consisting of magnesia, chromite, and mixtures of magnesia and chromite, from 1% to 5% of at least one bonding agent chosen from the group consisting of alkali metal tripolyphosphate and tetra-alkali metal-pyrophosphate, from 0% to 3% plasticizing agent, and from 0% to 3% added finely divided iron oxide.

2. Refractory composition consisting essentially of from 50% to 95% chromite grains, from 0% to 45% finely divided nonplastic magnesia, from 1% to 5% of at least one bonding agent chosen from the group consisting of alkali metal tripolyphosphate and tetra-alkali metal-pyrophosphate, from 0.05% to 3% plasticizing agent, and from 0% to 3% added finely divided iron oxide.

3. Refractory composition as in claim 2 wherein said bonding agent is sodium tripolyphosphate.

4. Refractory composition as in claim 2 wherein said bonding agent is tetrasodiumpyrophosphate.

5. Refractory composition as in claim 2 wherein said plasticizing agent is from 1% to 3% plastic clay.

6. Refractory composition as in claim 2 wherein said finely divided iron oxide is a dust recovered as a precipitate from the fumes issuing from an oxygen converter and contains at least 85% iron oxide.

7. Refractory composition as in claim 2 wherein said plasticizing agent is from 0.05% to 1% organic plasticizing agent.

8. Refractory composition as in claim 2 wherein said iron oxide is mill scale ground to about 90% passing through a 325 mesh screen.

9. Refractory composition as in claim 2 wherein there is added from 0.5% to 3% of said finely divided iron oxide.

10. Refractory gunning mix consisting essentially of from 50% to 95% chromite grains passing a 20 mesh screen, from 0% to 45% finely divided nonplastic magnesia passing 100 mesh, from 1% to 5% of at least one bonding substance chosen from the group consisting of alkali metal tripolyphosphates and tetra-alkali metal-pyrophosphates, from 0.05% to 3% of a plasticizing agent, and from 0.5% to 3% finely divided iron oxide.

11. Refractory gunning mix as in claim 10 wherein said bonding substance is sodium tripolyphosphate.

12. Refractory gunning mix as in claim 10 wherein said bonding agent is tetrasodium pyrophosphate.

13. Refractory gunning mix as in claim 10 wherein said plasticizing agent is bentonite.

14. Refractory gunning mix as in claim 10 wherein said iron oxide is of particle size passing a 100 mesh screen and 80% passing 325 mesh.

15. A refractory gunning mix consisting essentially of from 50% to 90% chromite, from 5% to 45% finely divided nonplastic magnesia, from 3% to 3.5% sodium tripolyphosphate, from 1% to 3% plastic clay, and from 1% to 1.5% finely divided iron oxide.

16. Refractory gunning mix consisting essentially of about 82% chromite of particle size passing 20 mesh and 50% to 65% passing 100 mesh, 13% periclase of particle size passing 100 mesh, 3% to 3.5% sodium tripolyphosphate, 1% bentonite and from 1% to 1.5% iron oxide recovered from the fumes issuing from a zone wherein steel is produced by blowing molten ferrous metal with oxygen.

17. Refractory composition consisting essentially of periclase particles, from 1% to 5% of at least one bonding agent chosen from the group consisting of alkali metal tripolyphosphate and tetra-alkali metal-pyrophosphate, from 0% to 3% plasticizing agent, and from 0% to 3% added finely divided iron oxide.

18. In a method of applying refractory material to a furnace wall by gunning, the steps comprising preparing a refractory admixture consisting essentially of from 5% to 95% chromite, from 95% to 5% nonplastic magnesia, said chromite and said magnesia being expressed on the refractory oxide basis from 3% to 3.5% sodium tripolyphosphate, from 1% to 3% plastic clay and from 1% to 1.5% finely divided iron oxide, admixing therewith water in an amount of from 20% to 30% by weight of said admixture to form a slurry, and gunning said slurry onto a furnace wall.

19. In a method of applying refractory material to a furnace wall by gunning, the steps comprising preparing a refractory admixture consisting essentially of nonacid refractory particles chosen from the group consisting of high purity periclase, chromite, and mixtures of magnesia and chromite, from 1% to 5% of at least one bonding agent chosen from the group consisting of alkali metal tripolyphosphate and tetra-alkali metal-pyrophosphate, from 0.05% to 3% plasticizing agent and from 0% to 3% finely divided iron oxide, admixing water therewith in an amount of from 20% to 30% by weight of said admixture to form a slurry, and gunning said slurry onto a furnace wall.

References Cited by the Examiner

UNITED STATES PATENTS

| | | | |
|---|---|---|---|
| 2,077,258 | 4/1937 | Pitt et al. | 106—55 |
| 3,093,496 | 6/1963 | Demaison et al. | 106—59 |

References Cited by the Applicant

UNITED STATES PATENTS

| | | |
|---|---|---|
| 2,077,258 | 4/1937 | Pitt et al. |
| 2,372,236 | 3/1945 | Wainer. |
| 3,010,166 | 11/1961 | Skoning. |
| 3,057,740 | 10/1962 | Skoning. |
| 3,093,496 | 6/1963 | Demaison et al. |

OTHER REFERENCES

Fundamental Studies of Phosphate Bonding Refractories: I, Literature Review.

Journal of the American Ceramic Society, volume 33, pages 239–241 (August 1, 1950), William David Kingery.

Journal of Metals, June 1965, pages 663–669, R. W. Limes, Bonds for Gunning Materials.

TOBIAS E. LEVOW, *Primary Examiner.*

J. E. POER, *Assistant Examiner.*